(12) United States Patent
Alfred et al.

(10) Patent No.: US 9,390,420 B2
(45) Date of Patent: Jul. 12, 2016

(54) SYSTEM AND METHOD FOR WIRELESS ORDERING USING SPEECH RECOGNITION

(75) Inventors: Joseph Anderson Alfred, Somerset, NJ (US); Joseph M. Sommer, Rutherford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1125 days.

(21) Appl. No.: 12/339,861

(22) Filed: Dec. 19, 2008

(65) Prior Publication Data
US 2010/0161446 A1   Jun. 24, 2010

(51) Int. Cl.
G06Q 30/00 (2012.01)
G06F 17/30 (2006.01)
G06Q 20/10 (2012.01)
G06Q 30/06 (2012.01)

(52) U.S. Cl.
CPC .............. *G06Q 30/00* (2013.01); *G06Q 20/102* (2013.01); *G06Q 30/0601* (2013.01)

(58) Field of Classification Search
CPC ........................... G06Q 30/0601; G06Q 30/00
USPC ...................................................... 705/26–27
See application file for complete search history.

(56) References Cited

U.S. PATENT DOCUMENTS

| | | | |
|---|---|---|---|
| 7,110,963 B2 * | 9/2006 | Negreiro ........................ 705/15 |
| 7,328,176 B2 * | 2/2008 | Tarvydas et al. ................ 705/26 |
| 2002/0019778 A1 * | 2/2002 | Isaacson et al. ................ 705/26 |
| 2004/0236573 A1 * | 11/2004 | Sapeluk ........................ 704/224 |
| 2005/0071362 A1 * | 3/2005 | Nelson .................. G06Q 10/06 |
| 2005/0154652 A1 * | 7/2005 | Bezos et al. .................... 705/27 |
| 2005/0245241 A1 * | 11/2005 | Durand et al. ............. 455/414.1 |
| 2007/0208626 A1 * | 9/2007 | Awiszus ........................ 705/26 |
| 2008/0091412 A1 * | 4/2008 | Strope et al. .................... 704/10 |
| 2008/0103913 A1 * | 5/2008 | Leach et al. .................... 705/26 |
| 2009/0228270 A1 * | 9/2009 | Odell et al. .................... 704/231 |
| 2009/0319272 A1 * | 12/2009 | Coulomb et al. ............. 704/251 |

OTHER PUBLICATIONS

Hanson, J. W. (1980). A proposed paradigm for consumer product disposition processes. The Journal of Consumer Affairs (Pre-1986), 14(1), 49. Retrieved from http://search.proquest.com/docview/222332269?accountid=14753.*

* cited by examiner

*Primary Examiner* — Kathleen Palavecino

(57) ABSTRACT

Disclosed herein are systems, computer-implemented methods, and tangible computer-readable media for placing an order for a user. The method includes receiving a search from a user, identifying a product category based on the search, presenting to the user a general ordering screen based on the identified product category, selecting and activating a speech recognition grammar tuned for the identified product category, recognizing a first received user utterance with the activated tuned grammar to identify a vendor who offers items in the identified product category, recognizing a second received user utterance with the activated tuned grammar to identify a specific item from the identified vendor, and placing an order for the specific item with the identified vendor for the user. In one aspect, the method further offers to sell the user additional items ancillary to the specific item.

20 Claims, 3 Drawing Sheets

SYSTEM AND METHOD FOR WIRELESS ORDERING USING SPEECH RECOGNITION

BACKGROUND OF THE INVENTION

1. Field of the Invention

The present invention relates to product ordering and more specifically to placing product orders for users based on speech recognition.

2. Introduction

With the widespread popularity of the Internet and secure ways to conduct commerce online, consumers purchase goods and services online with increasing frequency. Online commerce differs from traditional brick-and-mortar commerce because consumers can browse to any web address with minimal difficulty. The geographic and spatial distance between businesses does not matter because each business's web presence is literally at the consumer's fingertips. However, consumers are easily overwhelmed by so many options and may not know all the relevant options or even which options are relevant.

Often a consumer does not have a specific merchant or a specific item in mind, but just a category, such as pizza parlor, florist, or toy store. Searching for a category of merchants and making a purchase with one is a cumbersome and mismatched process involving opening a search engine, formulating a query, browsing through the results one by one until a particular result is good enough. Each merchant has a different interface, separate user profiles, different product lines, etc. If the user is not already familiar with a particular merchant, the user is less likely to visit that merchant in an online environment. In a mall, for example, a merchant's store front, decor, music, employees, etc. are an invitation for consumers to enter, browse, and purchase. In other words, merchants can control the environment to some extent to make their store more appealing. Consumers wander through the mall, often for leisure, and browse stores that interest them. Many of the real life aspects of shopping are absent in online commerce. For example, a line of text in a list of search results does attract customers like a store window showing the latest fashions and advertising a sale or a pizza shop with a large picture of a slice of pizza and free samples.

Accordingly, what is needed in the art is an improved way for users to purchase goods and services from vendors in an easy-to-use, natural interface.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for placing an order for a user. The method includes receiving a search from a user, identifying a product category based on the search, presenting to the user a general ordering screen based on the identified product category, selecting and activating a speech recognition grammar tuned for the identified product category, recognizing a first received user utterance with the activated tuned grammar to identify a vendor who offers items in the identified product category, recognizing a second received user utterance with the activated tuned grammar to identify a specific item from the identified vendor, and placing an order for the specific item with the identified vendor for the user. In one aspect, the method further offers to sell the user additional items ancillary to the specific item. In another aspect, the method further receives user billing information and pays for the placed order using the received user billing information. The method can communicate to the user information regarding order pick up. The method can gather delivery instructions from the user and communicate the gathered delivery instructions to the identified vendor.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
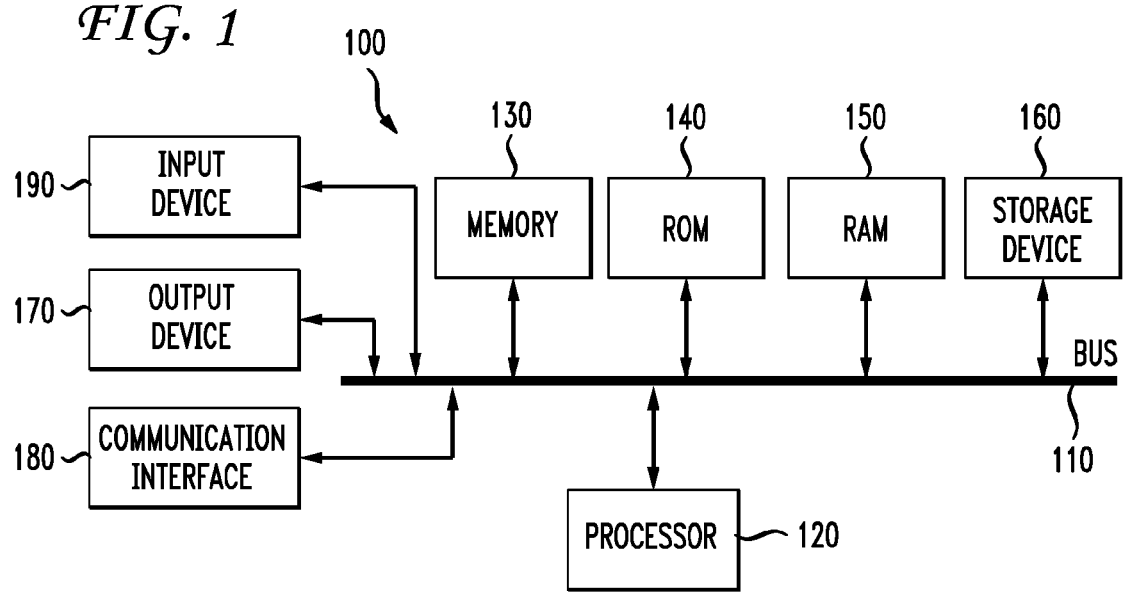
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
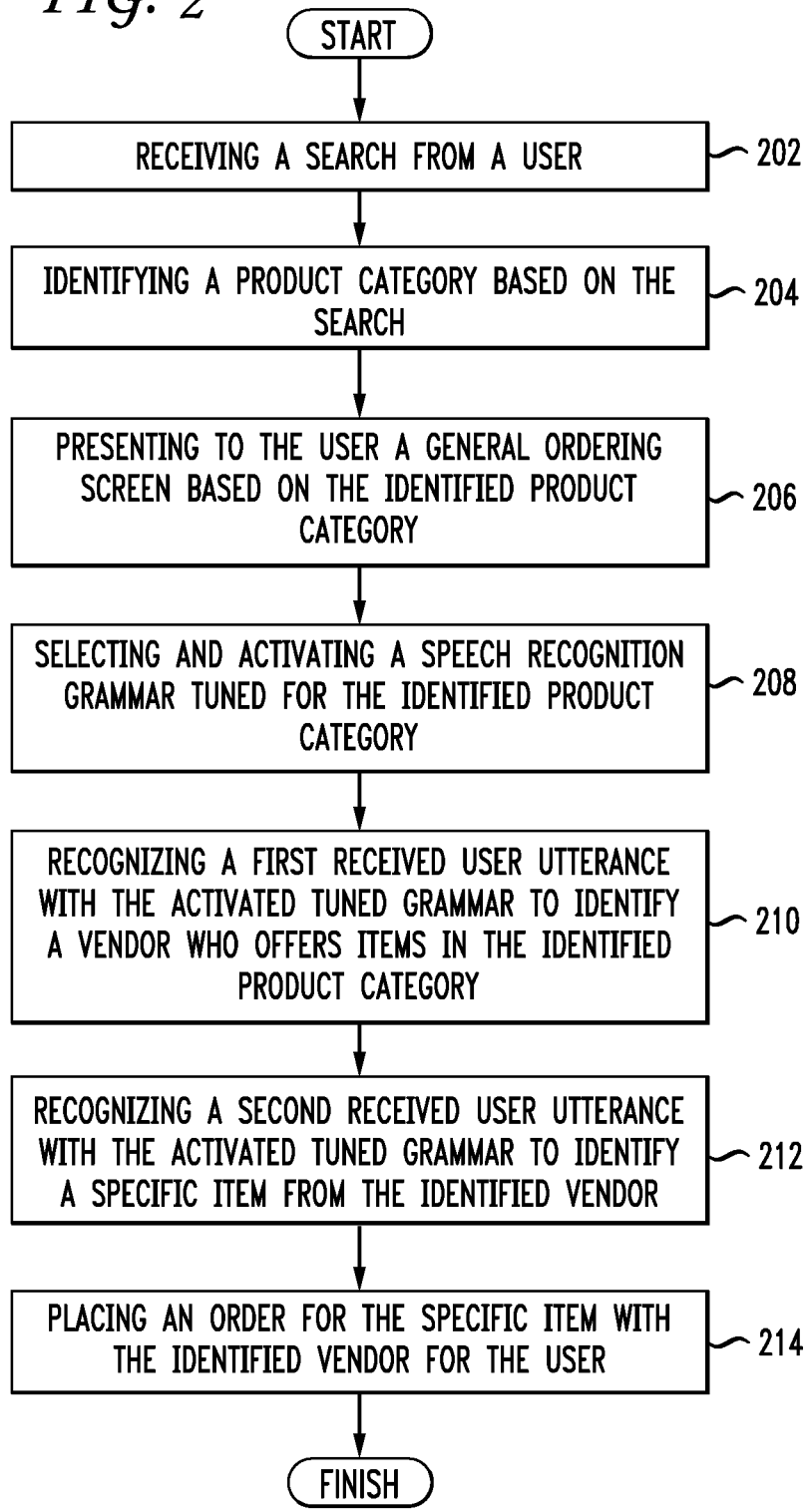
FIG. 2 illustrates an example method embodiment.

Having disclosed some fundamental system components, the disclosure turns to the exemplary method embodiment for placing orders on behalf of users as illustrated in FIG. 2. For clarity, the method is discussed in terms of a system configured to practice the method. The system first receives a search from a user (202). Some examples of a user search are a voice command, a text entry in a field, and a selection of a predefined category. For example, a user of a wireless device can search by saying the words "car rentals in Las Vegas", while a user at a computer can search by entering the text string "car rentals in Las Vegas". When the user enters speech at this initial search or at any later time in the process, the system can verify the user's identity with speaker recognition. For example, if the device is a cellular phone, the user's identity is somewhat known based on the cell phone number and/or other unique device identifiers. However, if someone steals or "borrows" the cell phone and attempts to place an order, the system can frustrate their efforts by authenticating the imposter based on speaker identification. This feature can be a setting the user can disable or enable to allow, for example, a spouse, child, close friend, or other trusted person to place orders using a cell phone that is not their own.

The system identifies a product category based on the search (204). The system can identify product or service categories very broadly, very narrowly, or somewhere in between. An example of a very broad product category is "pizza". A narrower category is "pizza in Omaha, Nebr.". A very narrow category is "pizza within 5 minutes of downtown Omaha, Nebr. for under $15". The system can define categories based on factors like location, price, quality, and reviews. In some cases, the search will include a location. In other cases where the product category is most likely restricted by location, such as almost any food category, the system can infer the location restriction when identifying the product category. One way to infer a location restriction is by GPS information on a cellular phone.

The system presents to the user a general ordering screen based on the identified product category (206). The general ordering screen can be a very simple, basic listing of products in the category. This screen can identify vendors in the ordering screen or not. In one example of a pizza category, the general ordering screen displays a picture of three different sizes of pizza on a wireless device. When the user selects the large pizza, the other two disappear and the system displays a graphic for each available topping. The user can say the name of each topping or the user can drag them with a mouse, stylus, or finger in order to place them on the picture of the large pizza. The general ordering screen can show and dynamically update the estimated price or the lowest price for the item based on vendors and products which match the identified product category.

The system selects and activates a speech recognition grammar tuned for the identified product category (208). In a pizza ordering category, the system can use a speech recognition grammar tuned to recognize commonly used words describing the product such as pepperoni, mushroom, olive, Canadian bacon, stuffed crust, large, medium, and small. The grammar can also include common vendors such as Domino's and Pizza Hut. The system can select grammars from a predetermined list. In one aspect, the system dynamically develops and refines grammars for categories based on what users actually say.

The system recognizes a first received user utterance with the activated tuned grammar to identify a vendor who offers items in the identified product category (210). The system recognizes a second received user utterance with the activated tuned grammar to identify a specific item from the identified vendor (212). The order in which the system recognizes these utterances is not important. The system can recognize both in one utterance. In the pizza example, the user can say "Large pepperoni pizza from Domino's" rather than saying two distinct, separate utterances.

In one variation, the system offers to sell the user additional items ancillary to the specific item. In the example of ordering pizza, the system can offer to sell the user breadsticks, a desert pizza, soft drinks, or garlic bread. The system can display images of these ancillary items to the user as they are offered to provide an experience similar to going to the pizza shop and seeing the fresh breadsticks pulled out of the oven.

The system places an order for the specific item with the identified vendor for the user (214). The system can place the order using a variety of methods. For example, the system can send a text message or email to the identified vendor. The system can use speech synthesis to call the vendor and place the order. The order can include an indication that it was placed on behalf of the user. In one aspect, the system requests a receipt from the vendor. When the system receives the receipt, the system notifies the user that the order has been received.

Some vendors require payment in advance before pickup or delivery. In these cases, the system can receive user billing information and pay for the placed order using the received user billing information. The user can enter credit card information or Paypal account information in a user profile for ordering pizza, which the system uses to pay pizza vendors. In one aspect, the system retains a portion of the payment in exchange for directing the user to purchase from the vendor. In another aspect, the system further communicates to the user information regarding order pick up or gathers delivery instructions from the user and communicates the gathered delivery instructions to the identified vendor.

The system can retrieve a user profile associated with the verified user. One way the system can use the retrieved user profile is to ask if the user wants to order a commonly ordered item from a commonly used vendor in the order history and place an order for the commonly ordered item from the commonly used vendor if the user responds positively. For example, if the user has ordered a large mushroom pizza from Papa John's in eight of the last ten orders, the system can provide a prompt at the general ordering screen (or elsewhere) offering "the usual", which is a large mushroom pizza from Papa John's.

Figure 3:
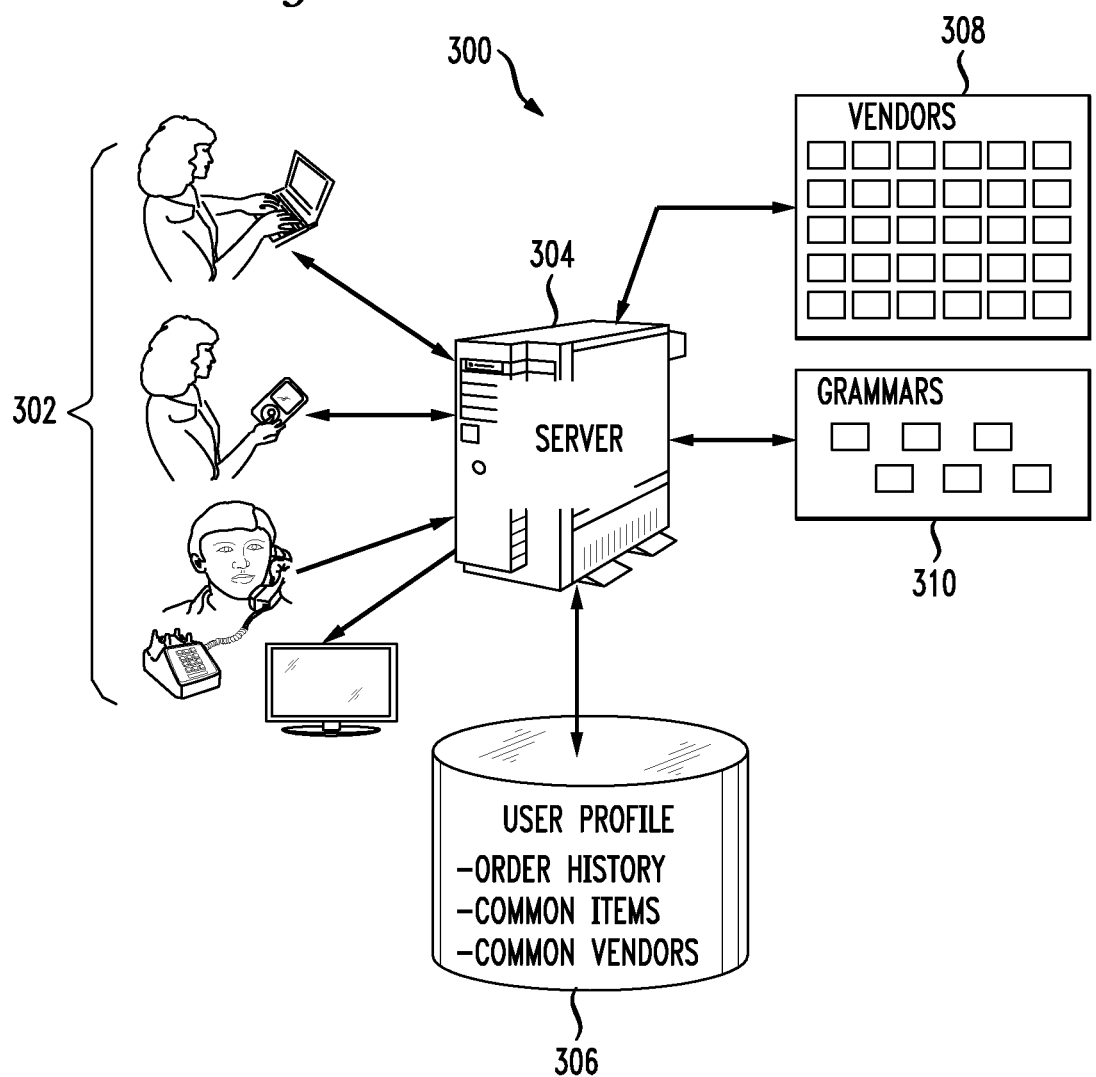
FIG. 3 illustrates an example system for placing orders on behalf of users.

FIG. 3 illustrates an example system for placing orders on behalf of users. The system 300 can receive communications from users 302 at a server 304. The communications can be multimodal. The communications can include, for example, voice commands, gestures, mouse clicks, and button presses. The communications can be searches. For instance, a user can say "search", then type in a category of things to search for, such as "fast food". The server 304 identifies a product category based on the user communications. The server 304 retrieves and activates a category-specific grammar 310 and retrieves a group of vendors 308 offering goods or services in the category. The server can restrict or eliminate certain vendors from consideration based on the category and/or a user profile 306. For example, if the category is fast food, the server 304 can eliminate vendors who are more than 5 miles away. If the user indicates she will be in a particular part of town later that evening, the profile can restrict vendors to those in that particular part of town. The user profile can further include information regarding previous orders, commonly ordered items, common vendors, amounts previously spent, and specific item preferences (such as the user prefers pizzas with sausage but no olives, or the user prefers dresses from department stores rather than discount outlets).

The server presents a general ordering screen to the user. The server can present the ordering screen to the user on a mobile device, such as a smartphone, or on a device unrelated to the call, such as a television or digital photo picture frame. The system recognizes user speech with the category-specific grammar. The system can optimize category-specific grammars to recognize particular commonly used words and/or phrases in the category-specific domain. For instance, a grammar for ordering take-out Chinese food can be optimized to recognize words and phrases like "fried rice", "chow mein", and "General Tso's chicken". A grammar for ordering a rental car can be optimized to recognize words and phrases like "all wheel drive", "Chevrolet Cobalt", and the days of the week. The user identifies to the server 304 a product and a vendor using speech input. The server 304 recognizes the speech using the category-specific grammar 310 and places an order with the identified vendor. The server 304 can also offer or solicit to the user additional or ancillary items on the screen or verbally. In the case of pizza, the server 304 can offer breadsticks, mozzarella sticks, a soft drink, or a 2 for 1 pizza deal. In the case of a rental car, the server 304 can offer a discounted upgrade to a larger or more luxurious vehicle.

The server 304 can pay the vendor automatically using payment information in the user profile 306, such as a credit card. The server 304 can also gather payment information from the user for the current transaction and forward that information to the appropriate vendor 308. The server 304 can also receive payment from the user then pay the vendor without referring to any individual payment information of the user. In some cases, the server 304 retains a portion of the fee in exchange for directing the user to the vendor. The server 304 can also gather delivery instructions from the user or instruct the user where to pick up the product.

One vendor can host the server 304 and ensure that their product or service is always listed in comparison with other vendors, even if other vendors occasionally offer better prices or value. This approach exposes the vendor's brand to more potential customers and establishes an air of openness which can win over customers. Progressive Insurance currently operates using a similar model in the insurance industry by showing comparable rate quotes from competitor insurance companies. A vendor, such as a pizza place, can benefit from showing other vendors' offerings because they can track which competitors customers eventually patronize and tailor their own offerings to be more competitive or more distinctive.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to ordering almost any product or service, such as pizza, groceries, dairy products, personal services, hotel reservations, rental cars, and even vehicle purchases. Those skilled in the art will readily recognize various modifications and changes that may be made to the present invention without following the example embodiments and applications illustrated and described herein, and without departing from the true spirit and scope of the present invention.

We claim:

1. A method comprising:
   receiving a search from a user;
   identifying, by a processor, a product category based on the search to yield an identified product category;
   presenting to the user a general ordering screen based on the product category;
   selecting, by the processor and from a plurality of speech recognition grammars, a speech recognition grammar corresponding to the identified product category to yield a selected speech recognition grammar, the selected speech recognition grammar recognizing commonly used words and phrases describing a same item from different vendors in the identified product category;
   in response to an activation of the selected speech recognition grammar by the processor, recognizing, by the processor, a first user utterance to identify a vendor who offers items in the product category;
   in response to an activation of the selected speech recognition grammar by the processor, recognizing, by the processor, a second user utterance to identify a specific from the vendor; and
   placing an order for the specific item with the vendor.

2. The method of claim 1, further to sell the user additional items ancillary to the specific item.

3. The method of claim 1, further comprising:
   receiving user billing information; and
   paying for the order using the user billing information.

4. The method of claim 1, further comprising communicating to the user information regarding order pick up.

5. The method of claim 1, further comprising:
   gathering delivery instructions from the user; and
   communicating the delivery instructions to the vendor.

6. The method of claim 1, further comprising retrieving a user profile associated with the user.

7. The method of claim 6, wherein the user profile comprises an order history, the method further comprising:
   asking if the user wants to order a commonly ordered item from a commonly used vendor in the order history; and
   placing another order for the commonly ordered item from the commonly used vendor if the user responds positively.

8. The method of claim 1, further comprising displaying a graphical representation of the specific item on a screen of a wireless device.

9. The method of claim 1, wherein a wireless device receives the search from the user.

10. The method of claim 1, further comprising verifying an identity of the user with speaker recognition.

11. A system comprising:
    a processor; and
    a computer-readable, medium having instructions stored which, when executed by the processor, cause the processor to perform operations comprising:
    receiving a search from a user;
    identifying a product category based on the search to yield an identified product category;
    presenting to the user a general ordering screen based on the product category;
    selecting, from a plurality of speech recognition grammars, a speech recognition grammar corresponding to the identified product category to yield a selected speech recognition grammar, the selected speech recognition grammar recognizing commonly used words and phrases describing a same item from different vendors in the identified product category;
    in response to an activation of the selected speech recognition grammar by the processor, recognizing a first user utterance to identify a vendor who offers items in the product category;
    in response to an activation of the selected speech recognition grammar by the processor, recognizing a second user utterance to identify a specific item from the vendor; and
    placing an order for the specific item with the vendor.

12. The system of claim 11, the computer-readable medium having additional instructions stored which, when executed by the processor, cause the processor to perform operations comprising offering to sell the user additional items ancillary to the specific item.

13. The system of claim 11, the computer-readable medium having additional instructions stored which, when executed by the processor, cause the processor to perform operations comprising:
receiving user billing information; and
paying for the order using the user billing information.

14. The system of claim 11, the computer-readable medium having additional instructions stored which, when executed by the processor, cause the processor to perform operations comprising communicating to the user information regarding order pick up.

15. The system of claim 11, the computer-readable medium having additional instructions stored which, when executed by the processor, cause the processor to perform operations comprising:
gathering delivery instructions from the user; and
communicating the delivery instructions to the vendor.

16. A computer-readable storage device having instructions stored which, when executed by a computing device, cause the computing device to perform operations comprising:
receiving a search from a user;
identifying a product category based on the search to yield an identified product category;
presenting to the user a general ordering screen based on the product category;
selecting, from a plurality of speech recognition grammars, a speech recognition grammar corresponding to the identified product category to yield a selected speech recognition grammar, the selected speech recognition grammar recognizing commonly used words and phrases describing a same item from different vendors in the identified product category;
in response to an activation of the selected speech recognition grammar by the computing device, recognizing a first user utterance to identify a vendor who offers items in the product category;
in response to an activation of the selected speech recognition grammar by the computing device, recognizing a second user utterance to identify a specific item from the vendor; and
placing an order for the specific item with the vendor.

17. The computer-readable storage device of claim 16 having additional instructions stored which, when executed by the computing device, cause the computing device to perform operations comprising retrieving a user profile associated with the user.

18. The computer-readable storage device of claim 17, wherein the user profile comprises an order history, and having additional instructions stored which, when executed by the computing device, cause the computing device to perform operations comprising:
asking if the user wants to order a commonly ordered item from a commonly used vendor in the order history; and
placing another order for the commonly ordered item from the commonly used vendor if the user responds positively.

19. The computer-readable storage device of claim 16 having additional instructions stored which, when executed by the computing device, cause the computing device to perform operations comprising displaying a graphical representation of the specific item on a screen on a wireless device.

20. The computer-readable storage device of claim 16 having additional instructions stored which, when executed by the computing device, cause the computing device to perform operations comprising verifying an identity of the user with speaker recognition.

* * * * *